(12) United States Patent
Saitou et al.

(10) Patent No.: US 7,766,360 B2
(45) Date of Patent: Aug. 3, 2010

(54) STRADDLE-TYPE VEHICLE

(75) Inventors: Tetsurou Saitou, Shizuoka (JP); Shigeto Yamasaki, Shizuoka (JP)

(73) Assignee: Yamaha Hatsudoki Kabushiki Kaisha, Iwata-Shi (JP)

( * ) Notice: Subject to any disclaimer, the term of this patent is extended or adjusted under 35 U.S.C. 154(b) by 166 days.

(21) Appl. No.: 11/765,972

(22) Filed: Jun. 20, 2007

(65) Prior Publication Data
US 2008/0023244 A1   Jan. 31, 2008

(30) Foreign Application Priority Data
Jun. 23, 2006   (JP)   ............... 2006-173926
May 25, 2007   (JP)   ............... 2007-139750

(51) Int. Cl.
*B62J 9/00*   (2006.01)

(52) U.S. Cl. ............... 280/288.4; 180/218; 180/219; 180/220; 280/279; 280/835

(58) Field of Classification Search ............... 180/219, 180/89.1, 218, 220; 280/845, 833, 288.4, 280/835, 279; 362/473–476; 116/62.1; 73/493
See application file for complete search history.

(56) References Cited

U.S. PATENT DOCUMENTS

| 2,504,452 | A | * | 4/1950 | Rostan | ............... | 180/219 |
|---|---|---|---|---|---|---|
| 2,542,926 | A | * | 2/1951 | Jozif et al. | ............... | 362/475 |
| 4,687,072 | A | * | 8/1987 | Komuro | ............... | 180/219 |
| 6,158,279 | A | * | 12/2000 | Saiki | ............... | 73/493 |
| 6,407,663 | B1 | * | 6/2002 | Huggett | ............... | 340/461 |
| 6,497,300 | B2 | * | 12/2002 | Mori et al. | ............... | 180/219 |
| 6,688,175 | B2 | * | 2/2004 | Ogura et al. | ............... | 73/493 |
| D528,055 | S | * | 9/2006 | Komiya et al. | ............... | D12/192 |
| 7,677,771 | B2 | * | 3/2010 | Yamamoto et al. | ............... | 362/474 |
| 7,681,681 | B2 | * | 3/2010 | Satake et al. | ............... | 180/219 |
| 7,681,901 | B2 | * | 3/2010 | LaCour | ............... | 280/288.4 |
| 2001/0022248 | A1 | * | 9/2001 | Mori et al. | ............... | 180/219 |
| 2003/0052482 | A1 | * | 3/2003 | Yamaguchi et al. | ............... | 280/833 |
| 2006/0261590 | A1 | * | 11/2006 | Miyamoto | ............... | 280/835 |

FOREIGN PATENT DOCUMENTS

| JP | 11-208557 | 8/1999 |
|---|---|---|
| JP | 2000-128052 | 5/2000 |

* cited by examiner

*Primary Examiner*—Lesley Morris
*Assistant Examiner*—Tashiana Adams
(74) *Attorney, Agent, or Firm*—Rabin & Berdo, PC

(57) ABSTRACT

A motorcycle that reduces air resistance without a cowling includes a steering handle, a headlight unit disposed in front of a handle base disposed at a substantial center of the steering handle, a meter unit disposed above the handle base, and a fuel tank disposed behind the handle base. In a side view of the motorcycle, the headlight top surface, the meter top surface and the fuel tank top surface are smoothly connected.

20 Claims, 13 Drawing Sheets

[Fig. 1]
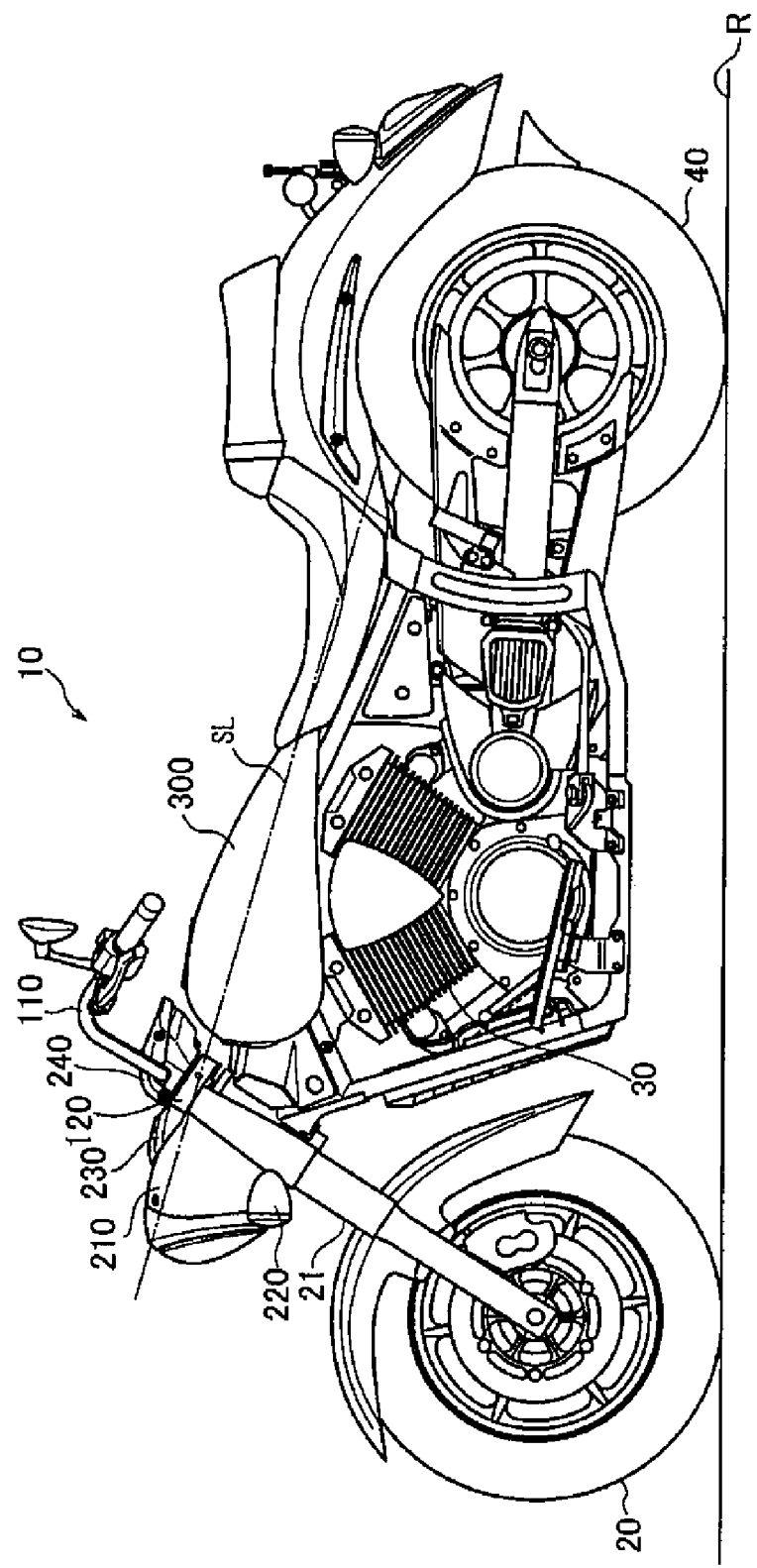

[Fig. 2]
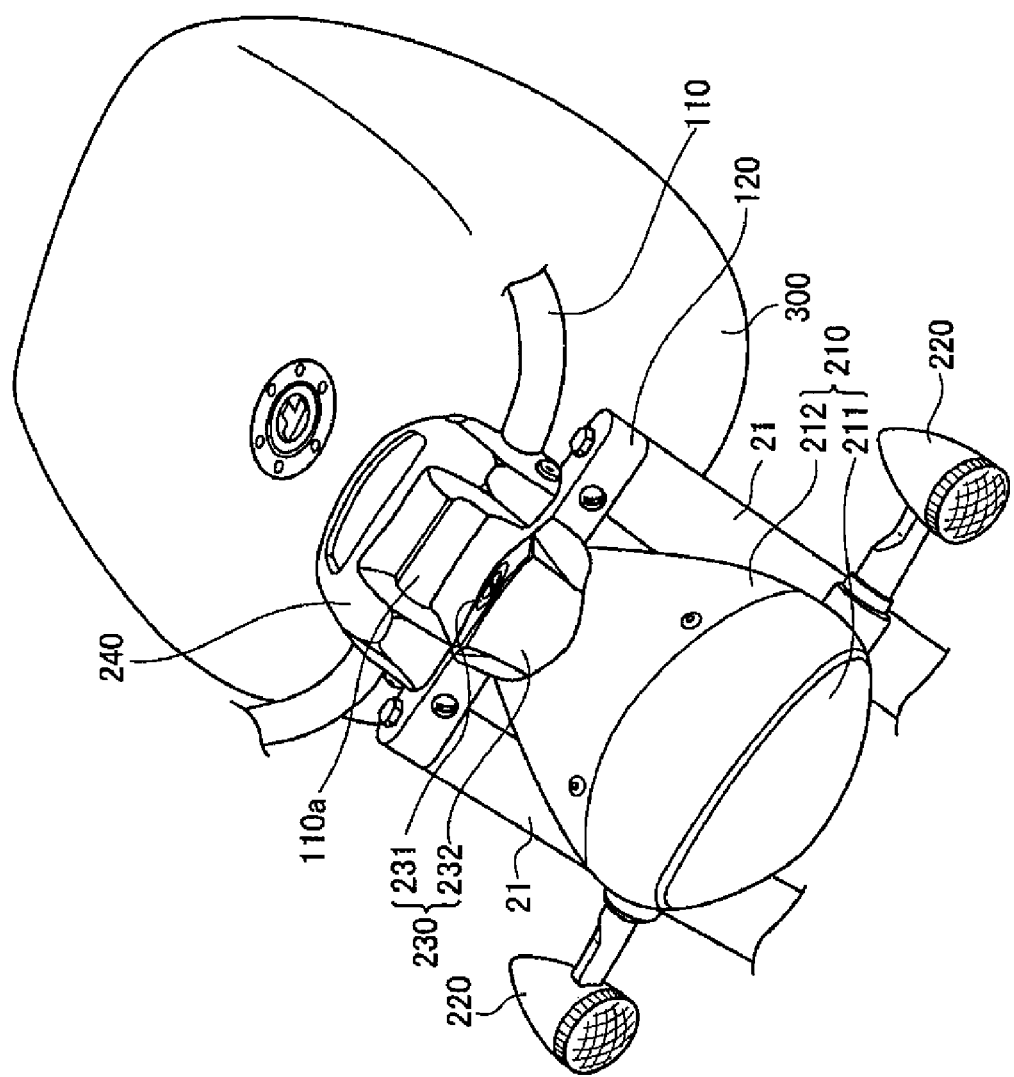

[Fig. 3]
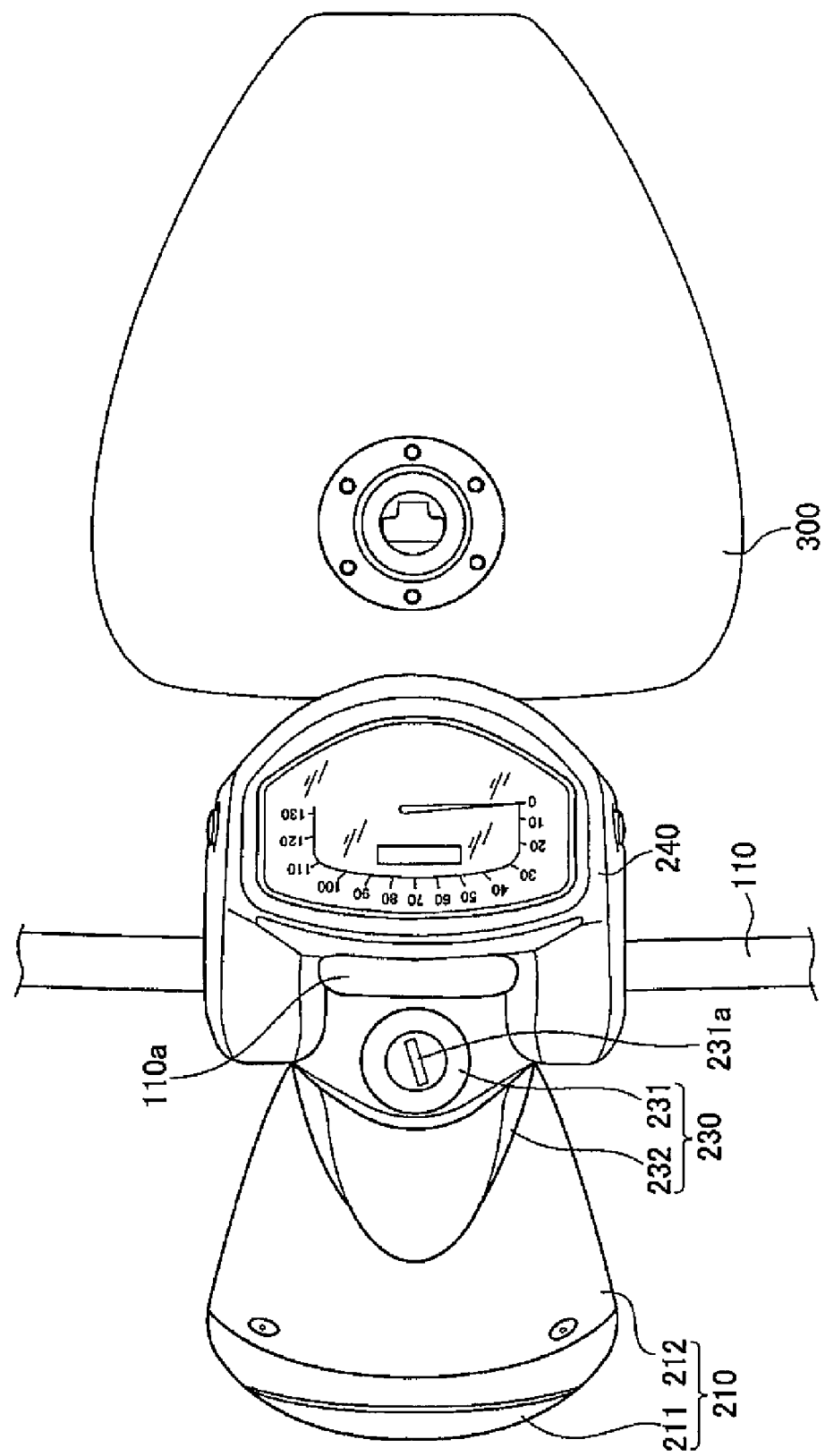

[Fig. 4]
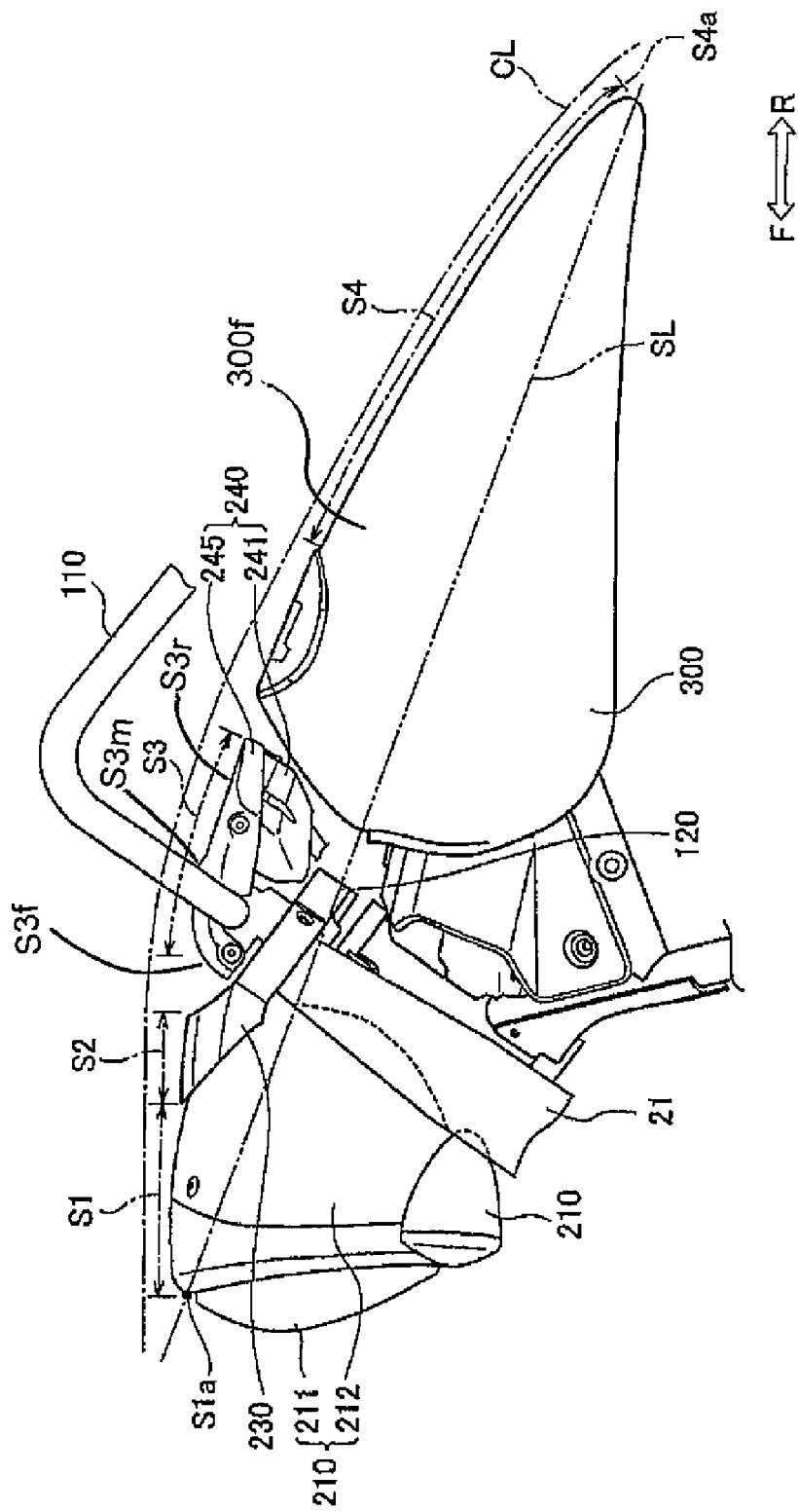

[Fig. 5]
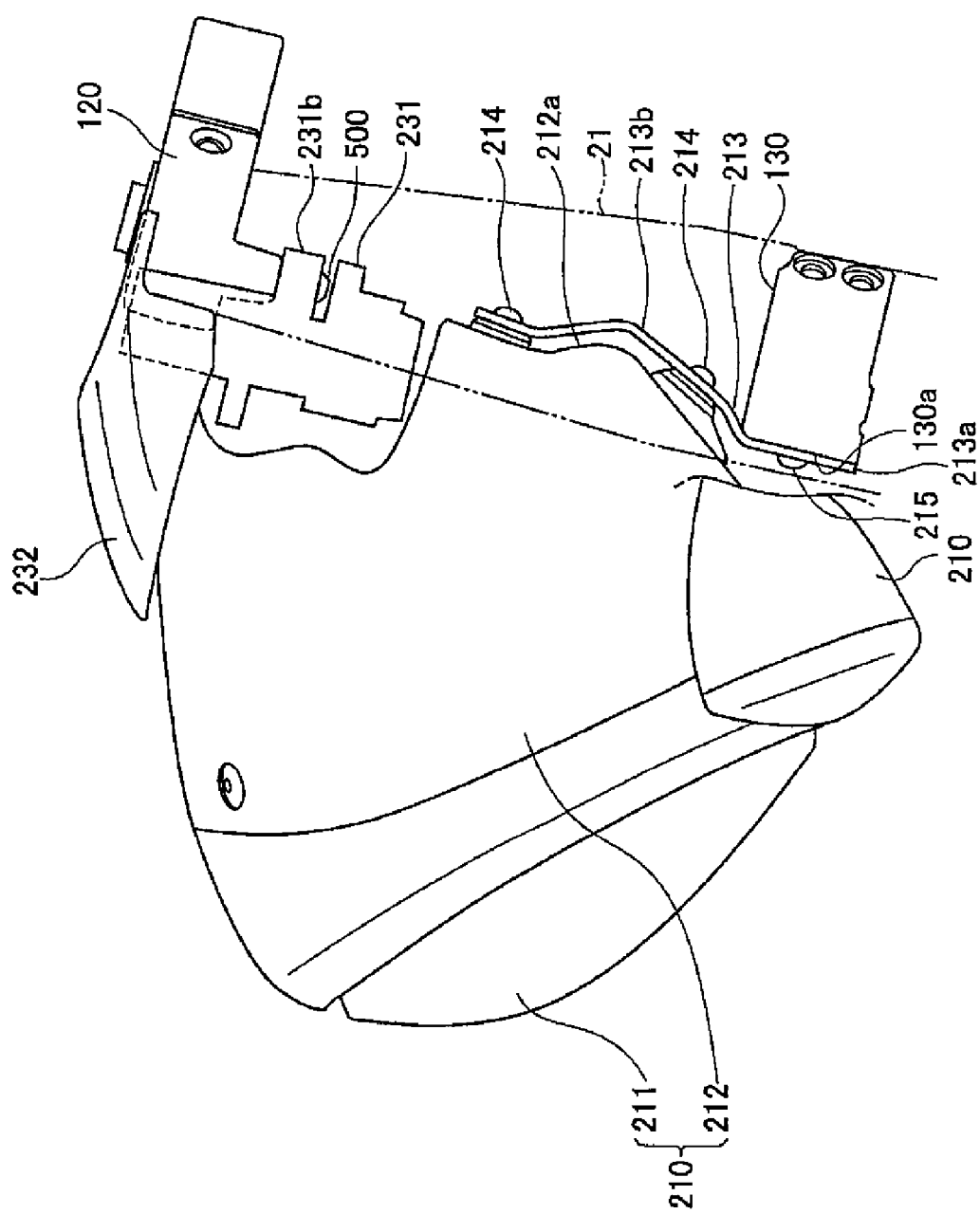

[Fig. 6]
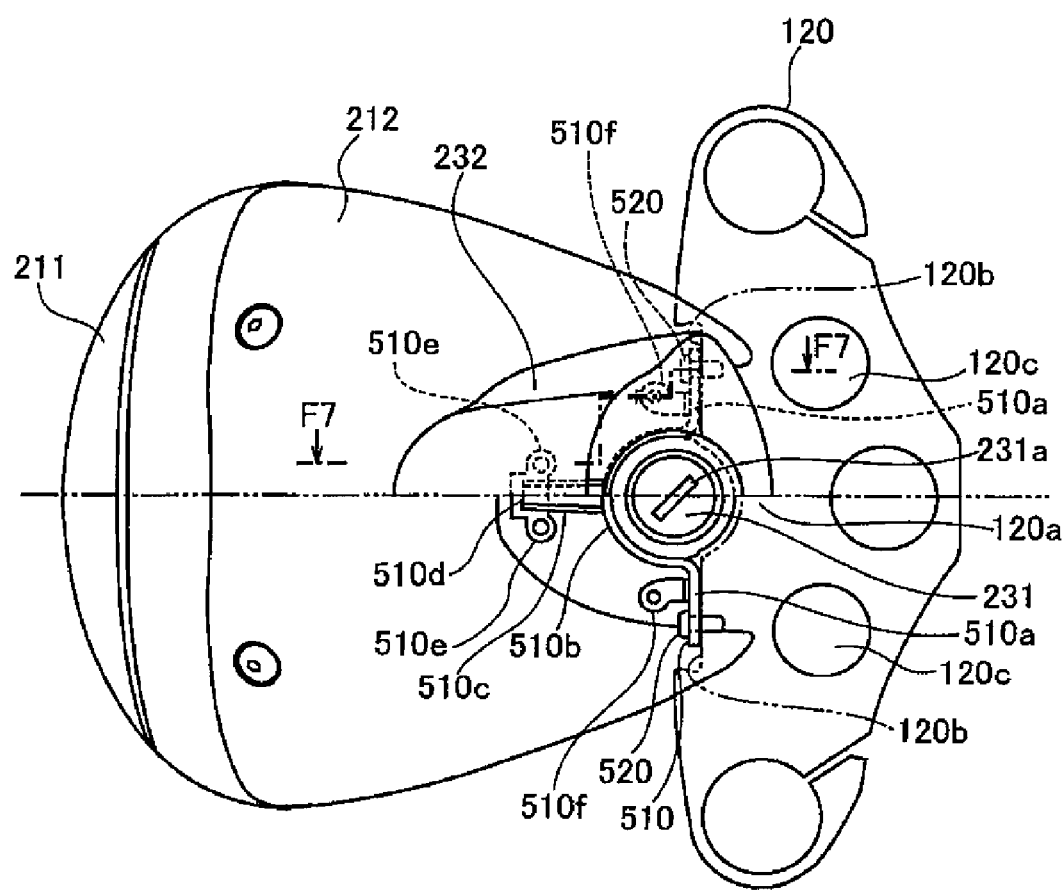

[Fig. 7]
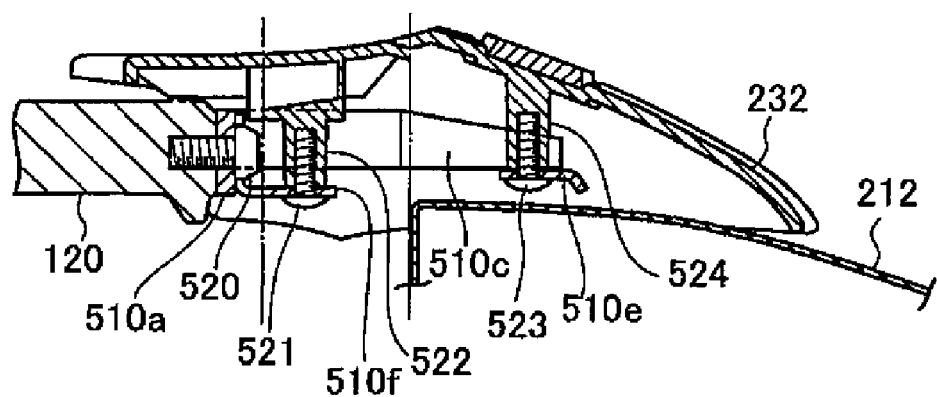

[Fig. 8]
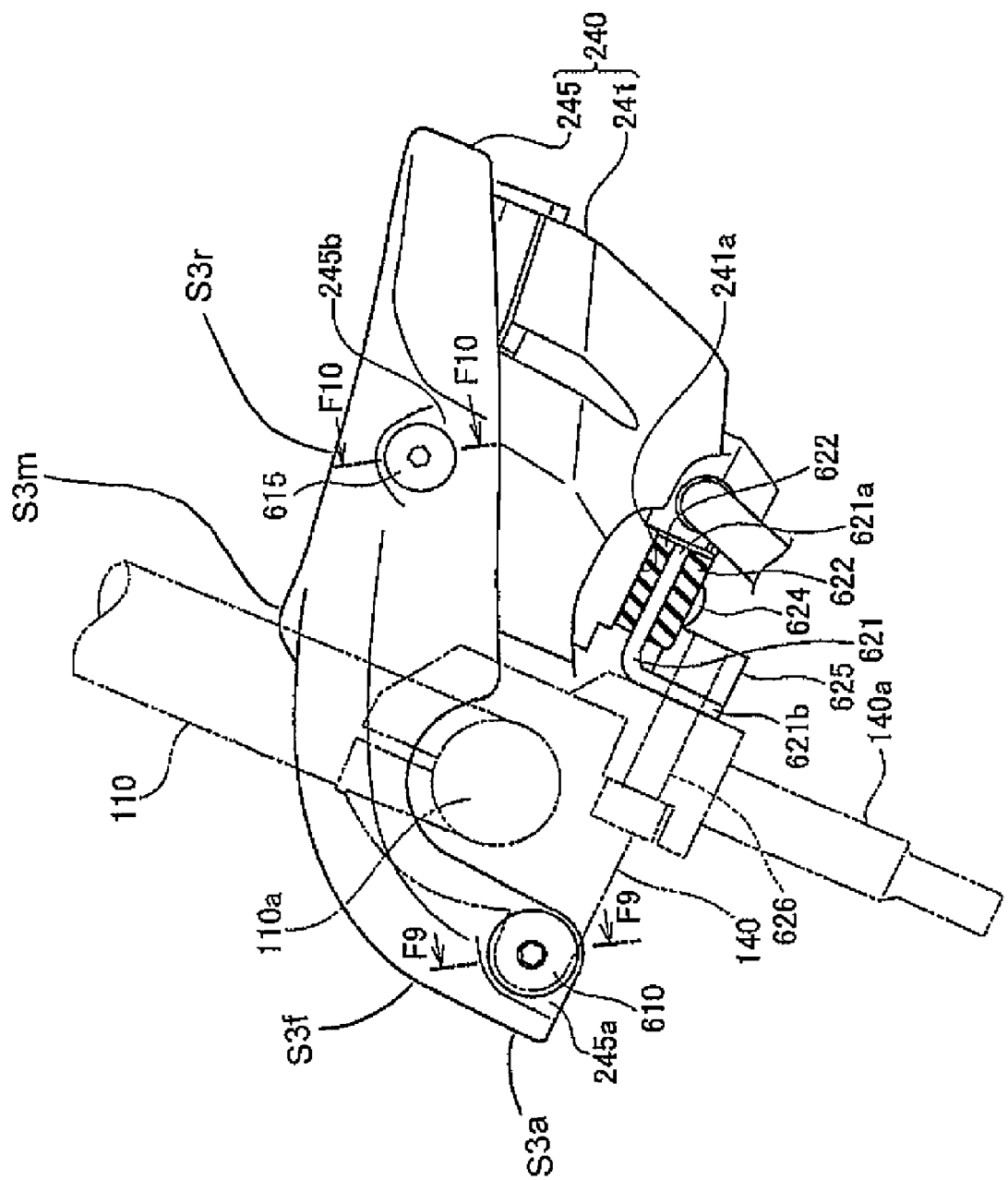

[Fig. 9]
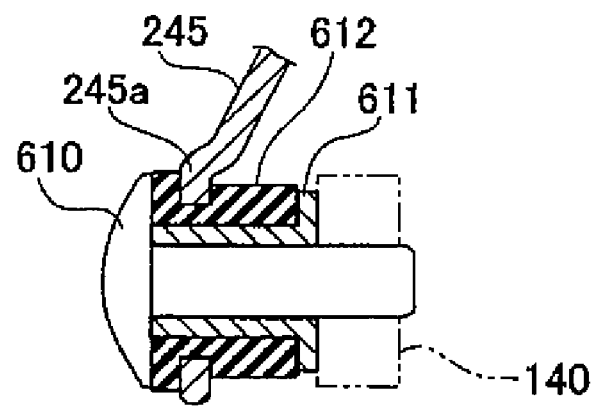

[Fig. 10]
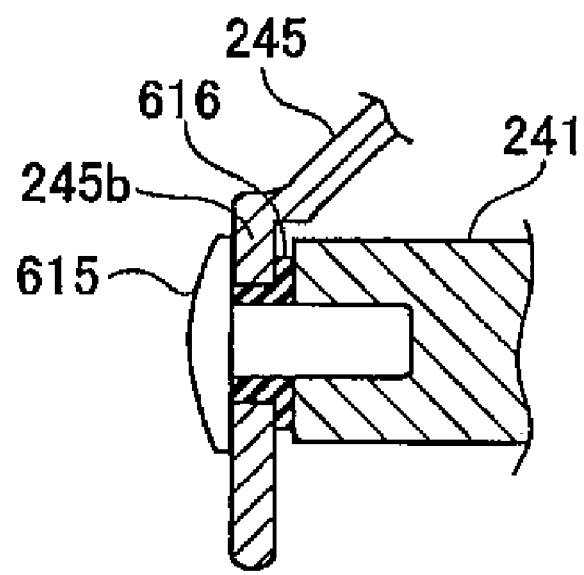

[Fig. 11]
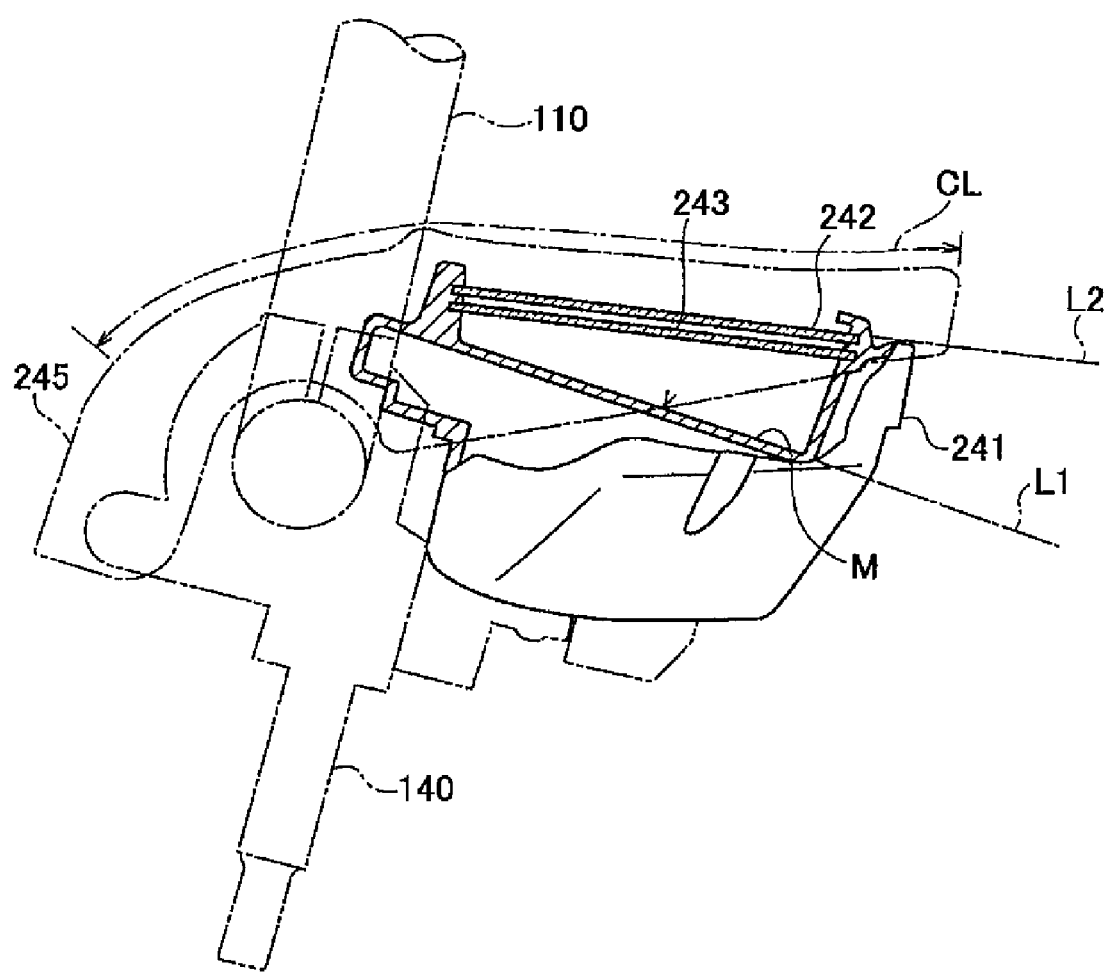

[Fig. 12]
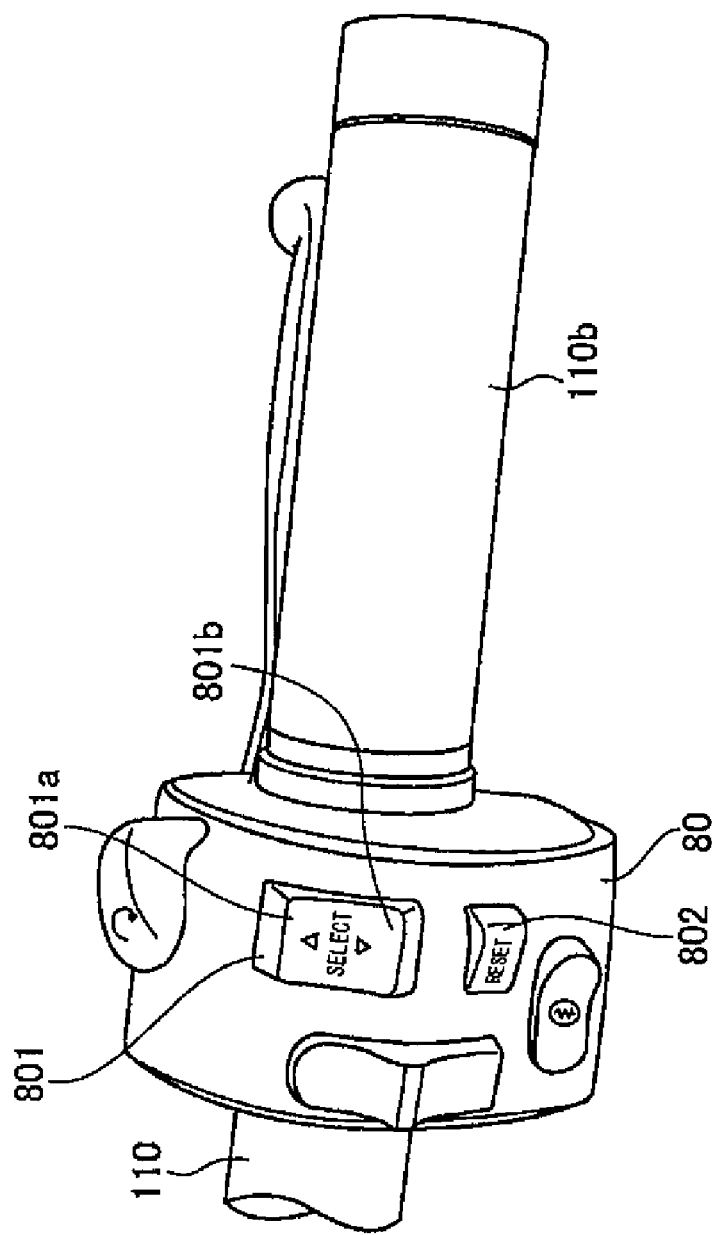

[Fig. 13]
(a) 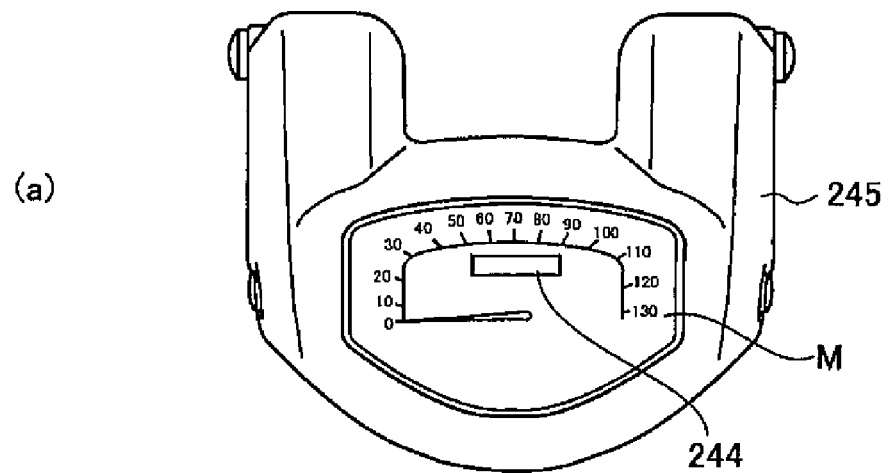
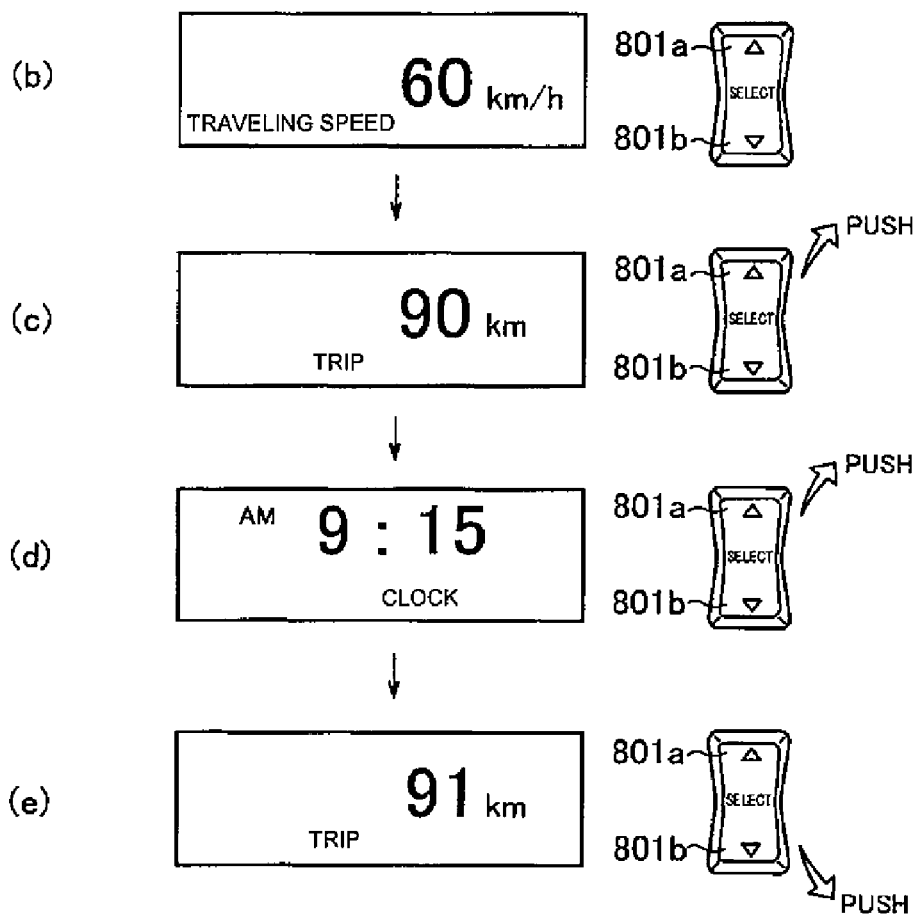

STRADDLE-TYPE VEHICLE

RELATED APPLICATIONS

This application claims the benefit of priority under 35 USC 119 of Japanese patent application no. 2006-173926, filed on Jun. 23, 2006, and Japanese patent application no. 2007-139750, filed on May 25, 2007, which applications are hereby incorporated by reference in their entireties.

BACKGROUND OF THE INVENTION

1. Field of the Invention

The present invention relates to a straddle-type vehicle with reduced air resistance and wind noise, and in which a rider can easily visually recognize indications in a meter unit while the vehicle is traveling.

2. Description of Related Art

In conventional straddle-type vehicles such as motorcycles, a cowling that covers part of the vehicle body is often used to reduce air resistance and wind noise. However, primarily because of exterior appearance requirements, straddle-type vehicles without such cowlings (so-called American-type straddle-type vehicles, for example) are widely provided (see JP-A-2000-128052 (FIGS. 1 and 2), for example).

In some straddle-type vehicles without such cowlings, portions other than the top surface of a meter unit (a speed meter and an odd meter, for example) are covered with a fuel tank, and the top surface of the meter unit is substantially flush with the top surface of the fuel tank in a side view of the straddle-type vehicle. In this configuration, air resistance and wind noise is reduced without a cowling.

A straddle-type vehicle with a meter unit incorporated in a fuel tank as described above, however, has the following problem. A rider disadvantageously cannot visually recognize indications in the meter unit unless the rider turns his/her eyes, which have been focused on a region in front of the straddle-type vehicle, to the fuel tank which is disposed closer to the rider.

SUMMARY OF THE INVENTION

The invention has been made in view of such circumstances and provides a straddle-type vehicle that reduces air resistance and wind noise without a cowling and that allows a rider to easily visually recognize the indications in the meter unit while the vehicle is traveling.

A straddle-type vehicle according to one embodiment of the invention includes a steering handle, a handle base disposed at a substantial center of the steering handle, a headlight unit disposed in front of the handle base, a meter unit disposed above the handle base, and a fuel tank disposed behind the handle base. In a side view of the vehicle, a top surface at a front section of the fuel tank gets higher from rear to front. In the side view of the vehicle, a top surface of the meter unit has a forward inclined surface that is formed at a front section of the meter unit and gets lower from rear to front, a rearward inclined surface that is formed at a rear section of the meter unit and gets lower from front to rear, and a curved surface that is connected to the forward inclined surface and the rearward inclined surface and curved upward. The rearward inclined surface substantially follows a forward extension from the top surface at the front section of the fuel tank. A front end of the forward inclined surface is situated close to a rear section of the headlight unit.

According to the invention, in the side view of the vehicle, the top surface of the meter unit has the forward inclined surface that is formed at the front section of the meter unit and gets lower from rear to front, the rearward inclined surface that is formed at the rear section of the meter unit and gets lower from front to rear, and the curved surface that is connected to the forward inclined surface and the rearward inclined surface and is curved upward. The rearward inclined surface substantially follows the forward extension from the top surface at the front section of the fuel tank. The front end of the forward inclined surface is situated close to the rear section of the headlight unit.

That is, since the headlight top surface, the meter top surface and the fuel tank top surface are smoothly connected to reduce air resistance and wind noise generated while the straddle-type vehicle is traveling, air resistance and wind noise is reduced without providing a cowling.

Since the meter unit is disposed above the handle base, the amount the rider moves his/her eyes from a region in front of the vehicle to the meter unit is reduced as compared to a case where the meter unit is disposed closer to the rider from the handle base. The rider can therefore easily visually recognize indications in the meter unit while the vehicle is traveling.

That is, air resistance and wind noise is reduced without a cowling, and the rider can easily visually recognize indications in the meter unit while the vehicle is traveling.

In one embodiment, a key cylinder unit into which an operation key is inserted is disposed between the headlight unit and the meter unit. In the side view of the vehicle, the top surface of the key cylinder unit substantially follows the rearward extension from the top surface of a central section of the headlight unit.

In one embodiment, the key cylinder unit has a key cylinder body and a key cylinder cover that covers the front of the key cylinder body. In the side view of the vehicle, the key cylinder cover is formed in a tapered manner such that the key cylinder cover gets narrower toward the front, and the front end of the key cylinder cover is situated close to the top surface of the headlight unit.

Another embodiment provides a handle holder that holds the handle base and elastic members disposed between the meter unit and the handle holder. The meter unit is secured to the handle holder via the elastic members.

Another embodiment provides a meter body and a meter cover that covers the meter body. The meter cover covers the meter body and the handle holder.

Another embodiment provides a meter stay that is disposed under the meter body and supports the meter body. One end of the meter stay is attached to the bottom of the meter body, and the other end of the meter stay is attached to the handle holder.

In another embodiment, the meter unit includes a dial having a display surface on which characters are displayed, and a transparent plate disposed above the dial. The display surface and the transparent plate are disposed such that they are inclined rearward and downward with respect to the vehicle, and the display surface is more inclined rearward and downward than the transparent plate. The transparent plate may be disposed substantially parallel to the rearward inclined surface.

A straddle-type vehicle according to another embodiment of the invention includes a steering handle, a handle base disposed at a substantial center of the steering handle, a headlight unit disposed in front of the handle base, a meter unit disposed above the handle base, and a fuel tank unit disposed behind the handle base. In a side view of the vehicle, a top surface of the headlight unit, a top surface of the meter unit, and a top surface of the fuel tank are smoothly connected.

According to the invention, air resistance and wind noise are reduced without a cowling, and the rider can easily visually recognize indications in the meter unit while the vehicle is traveling.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

FIG. 1 is a left side view of a motorcycle according to an embodiment of the invention.

FIG. 2 is an enlarged perspective view of a steering handle and its peripheral components including a headlight unit, a key cylinder unit, a meter unit and a fuel tank according to the embodiment of the invention.

FIG. 3 is an enlarged plan view of the steering handle and peripheral components of FIG. 2.

FIG. 4 is an enlarged side view of the steering handle and peripheral components of FIG. 2.

FIG. 5 is an enlarged side view of the headlight unit and the key cylinder unit.

FIG. 6 is an enlarged plan view of the headlight unit and the key cylinder unit.

FIG. 7 is a cross-sectional view taken along line F7-F7 of FIG. 6.

FIG. 8 is an enlarged side view of the meter unit.

FIG. 9 is a cross-sectional view taken along line F9-F9 of FIG. 8.

FIG. 10 is a cross-sectional view taken along line F10-F10 of FIG. 8.

FIG. 11 is an enlarged partial side view of a meter body according to an embodiment of the invention. FIG. 12 is an enlarged perspective view of a grip and a switch section according to an embodiment of the invention.

FIG. 13 shows the indication in a display section according to an embodiment of the invention.

DETAILED DESCRIPTION OF THE INVENTION (Overall Configuration of a Straddle-Type Vehicle)

Embodiments of a straddle-type vehicle according to the invention are described with reference to the drawings. In the drawings, same or similar portions have same or similar characters. The drawings are schematically drawn and the dimensions and the like are not to scale. Specific dimensions and the like should therefore be judged by taking the following description into account. The relationships between dimensions may be differently drawn in different figures and ratios of dimensions in one figure to those in other figures may vary.

The following description is made as follows: (1) Overall schematic configuration, (2) Installation of components around the steering handle, (3) Structure for attaching the headlight unit and the key cylinder unit, (4) Structure for attaching the meter unit, (5) Configuration of the meter body, (6) Configuration of the grip and its peripheral components, (7) Effects and Advantages, and (8) Other embodiments.

(1) Overall Schematic Configuration

FIG. 1 is a left side view of a motorcycle 10 that forms the straddle-type vehicle according to the present embodiment. Motorcycle 10 is a so-called American-type motorcycle allowing a riding position in which both legs are thrown forward, but is of course not limited thereto.

As shown in FIG. 1, motorcycle 10 includes a front wheel 20 and a rear wheel 40. An engine 30 drives rear wheel 40. Front wheel 20 is supported with a pair of right and left front forks 21 such that front wheel 20 can turn. An upper bracket 120 is connected to upper portions of right and left front forks 21. A bar-like steering handle 110 for changing the direction of front wheel 20 is attached to upper bracket 120.

A headlight unit 210 is disposed in front of steering handle 110 and projects light from a bulb in the direction in which motorcycle 10 is traveling. Front-side direction indicators 220 are attached to headlight unit 210.

A key cylinder unit 230 is disposed between headlight unit 210 and a meter unit 240. A key used in operating motorcycle 10 is inserted into key cylinder unit 230. Meter unit 240 is disposed above steering handle 110 and displays traveling speed, mileage and the like. A fuel tank 300 is disposed behind steering handle 110 and stores fuel to be supplied to engine 30.

(2) Installation of Components around the Steering Handle

Installation of headlight unit 210, key cylinder unit 230, meter unit 240 and fuel tank 300 is described with reference to FIGS. 2-4. Headlight unit 210 is disposed in front of steering handle 110 (specifically, a handle base 110a situated at the substantial center of steering handle 110 shown in FIG. 2). Headlight unit 210 includes a lens 211 and a headlight body 212. Lens 211 guides light emitted from the bulb in headlight body 212 to road surface R and the like in the direction in which motorcycle 10 is traveling.

Key cylinder unit 230 includes a key cylinder body 231 and a key cylinder cover 232. Key cylinder body 231 has a key hole 231a into which a key used in operating motorcycle 10 is inserted. Key cylinder body 231 is configured such that operating the key inserted in key hole 231a switches between an ON state in which power is supplied to various electrical components provided in motorcycle 10 and an OFF state in which supply of power is terminated. Key cylinder cover 232 extends from the front to the sides of key cylinder body 231 and covers the front and the sides of key cylinder body 231.

Meter unit 240 is disposed above handle base 110a and includes a meter body 241 and a meter cover 245 (see FIG. 4). Meter body 241 displays traveling speed, mileage and the like. Meter cover 245 covers meter body 241.

Installation of top surface S1 of headlight unit 210, top surface S2 of key cylinder unit 230, top surface S3 of meter unit 240, and top surface S4 of fuel tank 300 is described with reference to FIG. 4. As shown in side view of motorcycle 10 (FIG. 4), headlight top surface S1, meter top surface S3 and fuel tank top surface S4 are smoothly connected so as to form a substantially monotonic slope curve to effectively reduce air resistance in driving. As also shown in FIG. 4, the meter unit 240 is disposed in a v-shaped space formed between the headlight unit 210 and the fuel tank 300, where the highest point of the meter unit 240 is lower or at substantially the same height as the highest point of the headlight unit 210, so as not to obstruct an air flow from the top of the headlight unit 210 to that of the fuel tank 300.

Top surface S4 at a front section 300f of fuel tank 300 gets higher from rear to front. Top surface S3 of meter unit 240 has a forward inclined surface S3f, a rearward inclined surface S3r and a curved surface S3m. Forward inclined surface S3f is formed at a front section 245a of meter unit 240 and gets lower from rear to front. Rearward inclined surface S3r is formed at a rear section 245b of meter unit 240 and gets lower from front to rear. Curved surface S3m connects forward inclined surface S3f and rearward inclined surface S3r and is curved upward. Rearward inclined surface S3r substantially follows forward extension L1 from top surface S4 at front section 300f of fuel tank 300. Front end S3a of forward inclined surface S3f is situated close to a rear section 212r of headlight unit 210.

Top surface S2 of key cylinder unit 230 substantially follows rearward extension L2 from top surface S1 at a central section 212m of headlight unit 210. Key cylinder cover 232 (see FIG. 5) is formed in a tapered manner such that the key cylinder cover gets narrower toward its front section, and the front end of key cylinder cover 232 is situated close to top surface S1 of the headlight unit.

(3) Structure for Attaching the Headlight Unit and the Key Cylinder Unit

The structure for attaching headlight unit 210 and key cylinder unit 230 is described with reference to FIGS. 5-7.

(3.1) Structure for Attaching Headlight Unit 210

As shown in FIG. 5, a headlight bracket 213 has an attachment section 213a attached to an under bracket 130 and an attachment section 213b attached to a rear end section 212a of headlight body 212. A screw 215 is screwed into front surface 130a of under bracket 130 through a hole formed in attachment section 213a. Screws 214 are screwed into rear end section 212a of headlight body 212 through holes formed in attachment section 213b. In this way, headlight unit 210 is attached to under bracket 130 via headlight bracket 213.

(3.2) Structure for Attaching the Key Cylinder Unit 230

The structure for attaching key cylinder unit 230 (key cylinder body 231 and key cylinder cover 232) is described with reference to FIGS. 5-7. The configuration for attaching key cylinder body 231 is first described with reference to FIG. 5.

Key cylinder body 231 is disposed in front of substantial center 120a (see FIG. 6) of upper bracket 120 and has a key cylinder bracket 231b. Key cylinder bracket 231b is used to attach key cylinder body 231. As shown in FIG. 5, a screw 500 is screwed into the bottom of substantial center 120a of upper bracket 120 through a hole formed in key cylinder bracket 231b. In this way, key cylinder body 231 is attached to upper bracket 120.

The configuration for attaching key cylinder cover 232 is described with reference to FIGS. 6 and 7. As shown in FIG. 6, a cover bracket 510 is used to attach key cylinder cover 232.

Cover bracket 510 has flat sections 510a that face front surface 120b of upper bracket 120, a curved section 510b formed along the side of the substantial front half of key cylinder body 231 in the plan view of motorcycle 10, a projection 510c projecting forward from curved section 510b in the plan view of motorcycle 10, a front edge section S10d of projection 510c, and seats 510e extending from front edge section 510d in the horizontal direction. Seats 510f extending forward from flat portions 610a in the plan view of motorcycle 10 are formed at flat portions 510a. Screws 520 are screwed into front surface 120b of upper bracket 120 through holes formed in flat portions 510a. In this way, cover bracket 510 is attached to upper bracket 120.

As shown in FIG. 7, key cylinder cover 232 has projecting pieces 522 and projecting pieces 524 formed outward from the inside of key cylinder cover 232. Screws 521 are screwed into projecting pieces 522 through holes formed in seats 510f. Screws 523 are screwed into projecting pieces 524 through holes formed in seats 510e. In this way, key cylinder cover 232 is attached to cover bracket 510. Key cylinder cover 232 is thus attached to upper bracket 120 via cover bracket 510.

(4) Structure for Attaching the Meter Unit

The structure for attaching meter unit 240 (meter body 241 and meter cover 245) is described in detail with reference to FIGS. 8-10. In the present embodiment, meter cover 245 covers not only meter body 241 but also a handle holder 140 to which steering handle 110 is secured.

(4.1) Structure for Attaching the Meter Body

The structure for attaching meter body 241 is first described with reference to FIG. 8. FIG. 8 is an enlarged side view of meter body 241 and meter cover 245. As shown in FIG. 8, a meter stay 621 is disposed under meter body 241 and supports meter body 241. An end section 621a (at one end) of meter stay 621 is disposed between elastic members 622 and attached to bottom 241a of meter body 241 using a screw 624 along with elastic members 622.

A bolt 626 is screwed into an end section 621b (at the other end) of meter stay 621 through handle holder 140. Screwed bolt 626 is then screwed into a nut 625, so that end section 621b of meter stay 621 is attached to handle holder 140. Meter body 241 is thus attached to handle holder 140 via meter stay 621.

(4.2) Structure for Attaching the Meter Cover

The structure for attaching meter cover 245 is described in detail with reference to FIGS. 9 and 10. As shown in FIG. 9, a screw 610 is screwed into handle holder 140 through a spacer 611 at a front section 245a of each side of meter cover 245. An elastic member 612 is inserted between spacer 611 and front section 245a of meter cover 245. In this way, front section 245a of each side of meter cover 245 is attached to handle holder 140.

As shown in FIG. 10, a screw 615 is screwed into meter body 241 via an elastic member 616 at a rear section 245b of each side of meter cover 245. In this way, rear section 245b of each side of meter cover 245 is attached to meter body 241.

Meter unit 240 (meter body 241 and meter cover 245) is therefore attached to handle holder 140 via elastic members 612 and 622.

In this way, steering handle 110, handle holder 140, meter body 241 and meter cover 245 are assembled into an integrated subunit. The assembled subunit is mounted on upper bracket 120 by inserting and securing lower end sections 140a of handle holder 140 in holes 120c (see FIG. 6) in upper bracket 120.

(5) Configuration of the Meter Body

The configuration of meter body 241 is described with reference to FIG. 11. As shown in FIG. 11, meter body 241 includes transparent plates 242, 243 and a dial M. Transparent plate 242 forms the top surface of meter body 241. Transparent plate 243 is disposed apart from transparent plate 242. Dial M has a display surface M1 on which characters, such as markings indicative of traveling speed, are displayed. A display section 244 is also disposed in dial M (see FIG. 13).

As shown in FIG. 11, in the side view of motorcycle 10, straight line L11 passing through dial M and straight line L21 passing through transparent plate 242 (or transparent plate 243) are oriented diagonally downward toward rear wheel 40 of motorcycle 10. In the side view of motorcycle 10, straight line L11 is more inclined than straight line L21.

(6) Configuration of the Grip and its Peripheral Components

The configuration of the grip and its peripheral components is described with reference to FIGS. 12 and 13. A grip section 110b is disposed at an end section of steering handle 110.

A switch section 80 is disposed inside grip section 110b in the width direction of the vehicle. Switch section 80 is used to switch the indication in display section 244. In the present embodiment, switch section 80 includes a selection switch 801 and a reset switch 802.

Selection switch 801 is an alternating switch. Selection switch 801 is disposed such that the longitudinal direction of selection switch 801 is perpendicular to the longitudinal direction of steering handle 110. Alternatively, selection switch 801 may be disposed such that the longitudinal direction of selection switch 801 is parallel to the longitudinal direction of steering handle 110. Selection switch 801 switches the indication in display section 244 when an end section 801a or an end section 801b of selection switch 801 is pressed. The indication includes traveling speed, accumulated mileage, current time, residual amount of fuel, and mileage in a predetermined period (trip).

Reset switch 802 is used to reset the indication in display section 244. For example, when a trip value is displayed in display section 244, operating reset switch 802 resets the trip value.

A description of how the indication in display section 244 is switched is made with reference to FIG. 13. FIG. 13(a) shows display section 244 disposed in dial M. The indication in display section 244 shows, for example, the value of the traveling speed of motorcycle 10 (FIG. 13(b)). When end section 801a of selection switch 801 is pressed, selection switch 801 switches the traveling speed value to the trip value of motorcycle 10 (FIG. 13(c)). When end section 801a of selection switch 801 is further pressed, selection switch 801 switches the trip value to the current time (FIG. 13(d)). When end section 801b of selection switch 801 is pressed, selection switch 801 changes the indication by one step from the current time back to the trip value (FIG. 13(e)).

In this way, by pressing end section 801a or end section 801b of selection switch 801, the current indication is switched to the next or previous indication according to the setting order.

(7) Effects and Advantages

In motorcycle 10 according to the invention, headlight top surface S1, meter top surface S3 and fuel tank top surface S4 are smoothly connected. Specifically, top surface S3 of meter unit 240 has forward inclined surface S3f, rearward inclined surface S3r, and curved surface S3m. Forward inclined surface S3f is formed at front section 245a of meter unit 240 and gets lower from rear to front. Rearward inclined surface S3r is formed at rear section 245b of meter unit 240 and gets lower from front to rear. Curved surface S3m is connected to forward inclined surface S3f and rearward inclined surface S3r and curved upward. Rearward inclined surface S3r substantially follows forward extension L1 from top surface S4 at front section 300f of fuel tank 300. Front end S3a of forward inclined surface S3f is situated close to rear section 212r of headlight unit 210.

Therefore, according to the invention, air resistance and wind noise is reduced without providing a cowling on motorcycle 10.

Since meter unit 240 is disposed above handle base 110a, the amount the rider moves his/her eyes from a region in front of the vehicle to meter unit 240 is reduced as compared to the case where meter unit 240 is disposed closer to the rider from handle base 110a. The rider can therefore easily visually recognize indications in meter unit 240 even while the vehicle is traveling.

Furthermore, since meter unit 240 is secured to handle holder 140 via elastic members 612 and 622, vibration of meter unit 240 is reduced. The rider can therefore more easily visually recognize the indications in meter unit 240.

Moreover, since meter cover 245 covers not only meter body 241 but also handle holder 140, air resistance and wind noise is reduced more effectively.

Meter stay 621 is disposed under meter body 241. End section 621a of meter stay 621 is attached to the bottom of meter body 241, and end section 621b of meter stay 621 is attached to handle holder 140. In this way, the rider will hardly visually recognize meter stay 621, so that the exterior appearance of meter unit 240 is improved.

In the side view of motorcycle 10, straight line L11 passing through dial M and straight line L21 passing through transparent plate 242 (or transparent plate 243) are oriented diagonally downward toward rear wheel 40 of motorcycle 10, and straight line L11 is more inclined than straight line L21. In this configuration, dial M is more inclined to face the rider. The rider can therefore more easily visually recognize the indication in display section 244 and dial M.

When end section 801a or end section 801b of selection switch 801 is pressed, the current indication is switched to the next or previous indication according to the setting order. Since individual switches are not provided for respective indications, the rider can operate just one selection switch 801 to display a desired indication.

Since switch section 80 is provided at a position where a finger of the rider will not greatly move away from grip section 110b, the rider can quickly operate switch section 80 while ensuring stable operation of motorcycle 10.

Furthermore, since steering handle 110, handle holder 140, meter body 241 and meter cover 245 are assembled into an integrated subunit, the subunit is easily attached to the vehicle body.

(8) Other Embodiments

As described above, although the invention has been described with reference to an embodiment thereof, the description and drawings that form a part of this disclosure do not limit the invention. Various alternative embodiments will be apparent to those skilled in the art from the disclosure.

For example, although straight line SL passing through front end S1a of headlight top surface S1 and rear end S4a of fuel tank top surface S4 has been described as oriented diagonally downward toward rear wheel 40, straight line SL may pass between the upper end and the lower end of rear wheel 40.

Although meter unit 240 has been described as attached to handle holder 140 via elastic members 612 and 622, meter unit 240 may be attached to handle holder 140 without elastic members 612 and 622.

Although meter cover 245 has been described as covering not only meter body 241 but also handle holder 140, meter cover 245 may not cover handle holder 140.

Although meter stay 621 has been described as disposed under meter body 241, meter stay 621 may be disposed under a component other than meter body 241.

As described above, the invention of course includes various embodiments that are not described herein. The technological range of the invention shall therefore be defined only by the appended claims.

The invention claimed is:

1. A straddle vehicle comprising:
   a steering handle;
   a handle base disposed at a substantial center of the steering handle;
   a headlight unit disposed in front of the handle base;
   a meter unit disposed above and mounted directly onto the handle base; and
   a fuel tank disposed behind the handle base, wherein, in a side view of the vehicle,
      a top surface at a front section of the fuel tank gets higher from rear to front;
      a top surface of the meter unit has:
         a forward inclined surface that is formed at a front section of the meter unit and gets lower from rear to front, a rearward inclined surface that is formed at a rear section of the meter unit and gets lower from front to rear, and
a curved surface that is connected to the forward inclined surface and the rearward inclined surface and is curved upward;
the rearward inclined surface substantially follows a forward extension from the top surface at the front section of the fuel tank; and
a front end of the forward inclined surface is situated close to a rear section of the headlight unit.

2. A straddle vehicle, comprising:
a steering handle;
a handle base disposed at a substantial center of the steering handle;
a headlight unit disposed in front of the handle base;
a meter unit disposed above and mounted directly onto the handle base;
a fuel tank disposed behind the handle base; and
a key cylinder unit into which an operation key is inserted, the key cylinder unit being disposed between a surface of the headlight unit and the meter unit, wherein, in a side view of the vehicle,
a top surface at a front section of the fuel tank gets higher from rear to front;
a top surface of the meter unit has:
a forward inclined surface that is formed at a front section of the meter unit and gets lower from rear to front,
a rearward inclined surface that is formed at a rear section of the meter unit and gets lower from front to rear, and
a curved surface that is connected to the forward inclined surface and the rearward inclined surface and is curved upward;
the rearward inclined surface substantially follows a forward extension from the top surface at the front section of the fuel tank; and
a front end of the forward inclined surface is situated close to a rear section of the headlight unit.

3. The straddle vehicle according to claim 2, wherein in the side view of the vehicle, a top surface of the key cylinder unit substantially follows the rearward extension from the top surface at a central section of the headlight unit.

4. The straddle vehicle according to claim 2, wherein the key cylinder unit has a key cylinder body, and a key cylinder cover that covers a front of the key cylinder body, wherein,
in the side view of the vehicle, the key cylinder cover is formed in a tapered manner such that the key cylinder cover gets narrower toward the fronts, and
a front end of the key cylinder cover is situated close to a top surface of the headlight unit.

5. A straddle vehicle, comprising:
a steering handle;
a handle base disposed at a substantial center of the steering handle;
a headlight unit disposed in front of the handle base;
a meter unit disposed above and mounted directly onto the handle base;
a fuel tank disposed behind the handle base;
a handle holder that holds the handle base; and
elastic members disposed between the meter unit and the handle holder, the meter unit being secured to the handle holder via the elastic members; wherein, in a side view of the vehicle,
a top surface at a front section of the fuel tank gets higher from rear to front;

a top surface of the meter unit has:
a forward inclined surface that is formed at a front section of the meter unit and gets lower from rear to front,
a rearward inclined surface that is formed at a rear section of the meter unit and gets lower from front to rear, and
a curved surface that is connected to the forward inclined surface and the rearward inclined surface and is curved upward;
the rearward inclined surface substantially follows a forward extension from the top surface at the front section of the fuel tank; and
a front end of the forward inclined surface is situated close to a rear section of the headlight unit.

6. The straddle vehicle according to claim 5, wherein the meter unit comprises:
a meter body; and
a meter cover that covers the meter body, wherein
the meter cover covers the meter body and the handle holder.

7. The straddle vehicle according to claim 6 and further comprising:
a meter stay that is disposed under the meter body and supports the meter body,
wherein one end of the meter stay is attached to the bottom of the meter body and another end of the meter stay is attached to the handle holder.

8. The straddle vehicle according to claim 1, wherein the meter unit comprises:
a dial having a display surface on which characters are displayed; and
a transparent plate disposed above the dial, wherein
the display surface and the transparent plate are disposed such that they are inclined rearward and downward with respect to the vehicle, and
the display surface is more inclined rearward and downward than the transparent plate.

9. The straddle vehicle according to claim 8, wherein the transparent plate is disposed substantially parallel to the rearward inclined surface.

10. A straddle vehicle comprising:
a steering handle;
a handle base disposed at a substantial center of the steering handle;
a headlight unit disposed in front of the handle base;
a meter unit disposed above the handle base; wherein a top surface of said meter unit has; a forward inclined surface that is formed at a front section of the meter unit and gets lower from rear to front, a rearward inclined surface that is formed at a rear section of the meter unit and gets lower from front to rear, and a curved surface that is connected to the forward inclined surface and the rearward inclined surface and is curved upward; and a fuel tank disposed behind the handle base,
wherein
in a side view of the vehicle, a descending line can be drawn that smoothly connects and descends from each of a top surface of the headlight unit to a top surface of the meter unit, and then to a top surface of the fuel tank,
and the top surfaces of the headlight unit, the meter unit and the fuel tank are spaced apart from each other in a front-rear direction.

11. The straddle vehicle of claim 1, wherein a top surface of the headlight unit, the top surface of the meter unit, and a top surface of the fuel tank are smoothly connected to form a substantially monotonic slope curve.

12. The straddle vehicle of claim 1, wherein the front end of the forward inclined surface is situated closer to the rear section of the headlight unit than a frontmost end of the fuel tank is to the rear section of the headlight unit.

13. The straddle vehicle of claim 1, wherein the curved surface, in its entirety, is positioned lower than a top surface of the headlight unit.

14. The straddle vehicle of claim 10, wherein the meter unit is positioned between the headlight unit and the fuel tank.

15. The straddle vehicle of claim 1, wherein the meter unit is nested within a space formed between said headlight unit and said fuel tank, with a substantial portion of said meter unit being located lower, relative to the horizontal, than an uppermost portion of said headlight unit and an uppermost portion of said fuel tank, to thereby reduce air resistance and wind noise.

16. The straddle vehicle of claim 15, wherein the meter unit has a display that is inclined relative to a horizontal line, so as to be tilted toward a rider of the vehicle, and further has a transparent plate disposed over the display, the transparent plate being less inclined than the display.

17. The straddle vehicle of claim 1, wherein the meter unit is nested within a space formed between said headlight unit and said fuel tank, with a substantial portion of said meter unit being located lower, relative to the horizontal, than an uppermost portion of said headlight unit and an uppermost portion of said fuel tank, to thereby reduce air resistance and wind noise, and wherein the meter unit has a display that is inclined relative to a horizontal line, so as to be tilted toward a rider of the vehicle.

18. The straddle vehicle of claim 10, wherein the meter unit is nested within a space formed between said headlight unit and said fuel tank, with a substantial portion of said meter unit being located lower, relative to the horizontal, than an uppermost portion of said headlight unit and an uppermost portion of said fuel tank, to thereby reduce air resistance and wind noise.

19. The straddle vehicle of claim 18, wherein the meter unit has a display that is inclined relative to a horizontal line, so as to be tilted toward a rider of the vehicle, and further has a transparent plate disposed over the display, the transparent plate being less inclined than the display.

20. The straddle vehicle of claim 10, wherein the meter unit is nested within a space formed between said headlight unit and said fuel tank, with a substantial portion of said meter unit being located lower, relative to the horizontal, than an uppermost portion of said headlight unit and an uppermost portion of said fuel tank, to thereby reduce air resistance and wind noise, and wherein the meter unit has a display that is inclined relative to a horizontal line, so as to be tilted toward a rider of the vehicle.

* * * * *